US010926572B2

(12) United States Patent
Yu et al.

(10) Patent No.: US 10,926,572 B2
(45) Date of Patent: Feb. 23, 2021

(54) SECURITY ELEMENT WITH METALLIZED BEADS

(71) Applicant: 3M INNOVATIVE PROPERTIES COMPANY, St. Paul, MN (US)

(72) Inventors: Ta-Hua Yu, Woodbury, MN (US); William Blake Kolb, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/362,312

(22) Filed: Mar. 22, 2019

(65) Prior Publication Data

US 2019/0299699 A1 Oct. 3, 2019

Related U.S. Application Data

(60) Provisional application No. 62/648,551, filed on Mar. 27, 2018.

(51) Int. Cl.

| | |
|---|---|
| ***B42D 25/328*** | (2014.01) |
| ***B42D 25/373*** | (2014.01) |
| ***B42D 25/36*** | (2014.01) |
| ***B42D 25/324*** | (2014.01) |
| ***G09F 3/00*** | (2006.01) |
| ***G02B 5/18*** | (2006.01) |

(52) U.S. Cl.
CPC ......... *B42D 25/328* (2014.10); *B42D 25/324* (2014.10); *B42D 25/36* (2014.10); *B42D 25/373* (2014.10)

(58) Field of Classification Search
CPC .................................................... B42D 25/328
USPC .................... 283/67, 70, 72, 74, 94, 98, 901
See application file for complete search history.

(56) References Cited

U.S. PATENT DOCUMENTS

| | | | | |
|---|---|---|---|---|
| 5,988,822 A * | 11/1999 | Abe | ....................... | G02B 5/128 359/536 |
| 2011/0193335 A1* | 8/2011 | Budd | ...................... | C03C 12/02 283/75 |
| 2016/0016338 A1 | 6/2016 | Radcliffe | | |

FOREIGN PATENT DOCUMENTS

| | | |
|---|---|---|
| EP | 2192428 A1 | 6/2010 |

OTHER PUBLICATIONS

Extended European Search Report, EP191649*35.9; dated Sep. 17, 2019, 3 pages.

* cited by examiner

*Primary Examiner* — Justin V Lewis

(57) ABSTRACT

A security element, including: a substrate; a monolayer of beads on the substrate; and a metal layer on the monolayer of beads; wherein the size of the beads is in between about 100 nm to about 50 μm.

15 Claims, 1 Drawing Sheet

SECURITY ELEMENT WITH METALLIZED BEADS

BACKGROUND

Product counterfeiting has been on the rise in many industries. For protection, valuable articles, such as branded articles, are often provided with security elements that permit the authenticity of the articles to be verified, and that simultaneously serve as protection against unauthorized reproduction. Security elements play a special role in safeguarding authenticity, as these cannot be reproduced even with the most modern copiers. However, there is a need for better security elements.

SUMMARY

Thus, in one aspect, the present disclosure provides a security element, comprising: a substrate; a monolayer of beads on the substrate; and a metal layer on the monolayer of beads; wherein the size of the beads is in between about 100 nm to about 50 μm.

In another aspect, the present disclosure provides an article, comprising the security element of current application, and an adhesive, wherein the security element is embedded in the adhesive.

In another aspect, the present disclosure provides an article, comprising the security element of current application, a protective layer, wherein the security element is embedded in the protective layer.

In another aspect, the present disclosure provides a method, comprising: providing the security element of current application; and obtaining a reflective diffraction pattern from the security element.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this disclosure.

DETAILED DESCRIPTION

Before any embodiments of the present disclosure are explained in detail, it is understood that the invention is not limited in its application to the details of use, construction, and the arrangement of components set forth in the following description. The invention is capable of other embodiments and of being practiced or of being carried out in various ways that will become apparent to a person of ordinary skill in the art upon reading the present disclosure. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is understood that other embodiments may be utilized and structural or logical changes may be made without departing from the scope of the present disclosure.

As used in this Specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

There is an increased need for security elements to permit the authenticity of the articles to be verified, for example, branded articles. The present application provides a security element to, which can be used to verify the authenticity of the articles.

Figure 1:
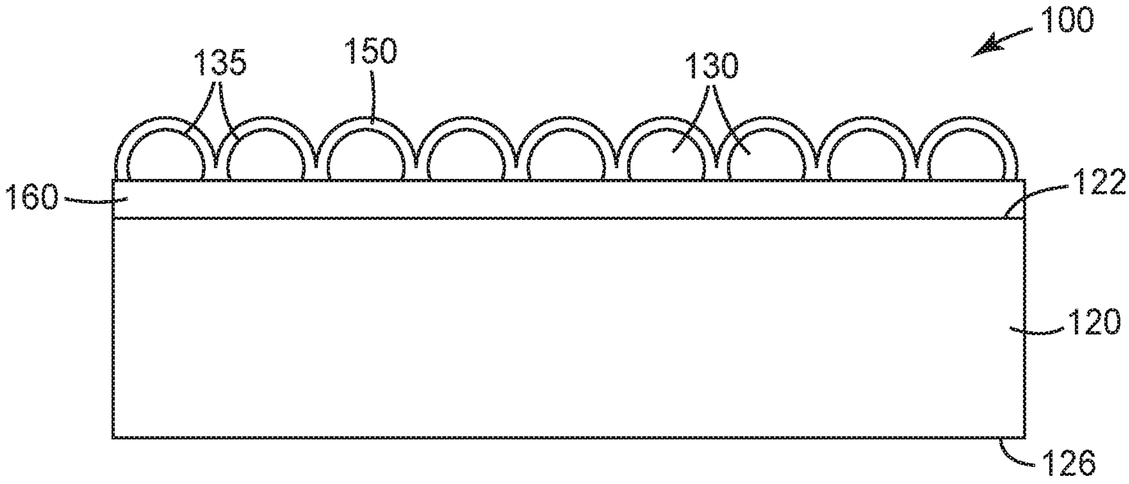
FIG. 1 is a schematic side view of one embodiment of security element.
Figure 1A:
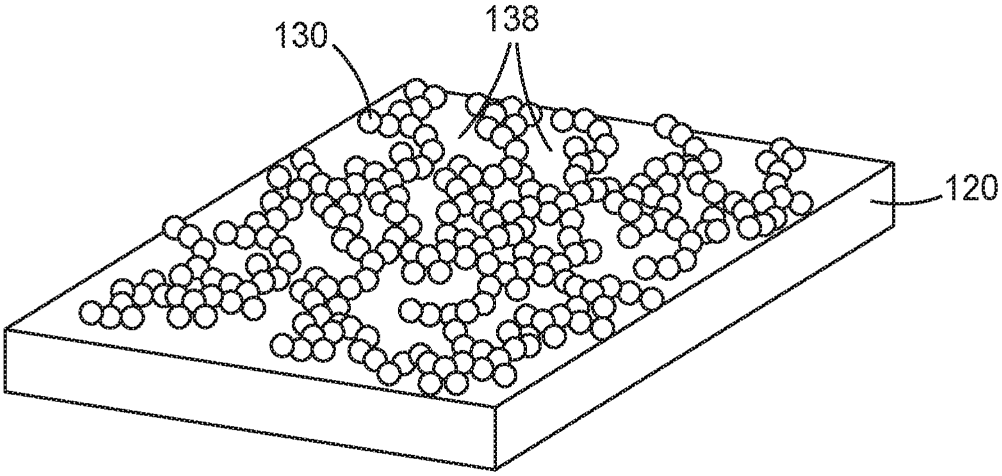
FIG. 1A is a perspective view of one embodiment of security element.

FIG. 1 is a schematic side view of one embodiment of security element 100. The security element 100 includes a substrate 120. The substrate 120 includes a first major surface 122 and a second major surface 126. The security element 100 may further include a monolayer of beads 130 on the substrate 120. Each bead has a respective outer surface 135. The security element 100 may further include a metal layer 150 on the monolayer of beads. In the embodiment of FIG. 1, the metal layer can be a continuous metal layer. In other embodiments, the metal layer can be a discontinuous metal layer. In some embodiments, the metal layer can conform to the shape of beads. In some embodiments, the metal layer can cover at least a part of outer surface 135 of each bead. The security element 100 may further include an optional binder 160. In the embodiment of FIG. 1, optional binder 160 is in between the monolayer of beads 130 and the substrate 120. In some embodiments, the monolayer of beads 130 can be a continuous monolayer. In some embodiments, the monolayer of beads 130 can be not patterned. As shown in FIG. 1A, the monolayer of beads 130 can include bead-less domains 138 in a random order. Alternatively, the monolayer of beads 130 can include ordered bead-less domains 138. In some embodiments, the security element 100 can include an additional monolayer of beads and an additional metal layer on the additional monolayer of beads. In some embodiments, the additional monolayer of beads can be on the metal layer 150. In some embodiments, the additional monolayer of beads can be on the second major surface 126 of the substrate 120 and the monolayer of beads 130 can be on the first major surface 122 of the substrate 120. In some embodiments, an article is provided. In some embodiments, the article can include the security element of the present application and an adhesive, wherein the security element is embedded in the adhesive. In some embodiments, the article can include the security element of the present application and a protective layer, wherein the security element is embedded in the protective layer.

Substrate may include any of a wide variety of non-polymeric materials, such as glass, or various thermoplastic and crosslinked polymeric materials, such as polyethylene terephthalate (PET), polyethylene naphthalate (PEN), (e.g. bisphenol A) polycarbonate, cellulose acetate, poly(methyl methacrylate), and polyolefins such as biaxially oriented polypropylene, cyclic olefin polymer (COP), and cyclic olefin copolymer (COP) which are commonly used in various optical devices. In some embodiments, the substrate may be removable substrate.

The metal layer or the additional metal layer can be formed from a variety of materials including, for example, individual metals, multilayer metals, two or more metals as mixtures, inter-metallics or alloys, semi-metals or metalloids, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, diamond-like carbon, diamond-like glass, graphene, and combinations thereof. Exemplary individual metals can include Au, Ag, Pt, Cu, Al and Cr. Exemplary metal oxides include silicon oxides such as silica, aluminum oxides such as alumina, titanium oxides such as titania, indium oxides, tin oxides, indium tin oxide (ITO), tantalum oxide, zirconium oxide, niobium oxide, and combinations thereof. Other exemplary materials include boron carbide, tungsten carbide, silicon carbide, aluminum nitride, silicon nitride, boron nitride, aluminum oxynitride, silicon oxynitride, boron oxynitride, zirconium oxyboride, titanium oxyboride, and combinations thereof.

The binder can be an organic binder. Examples of suitable organic binders that are useful in abrasive composites include phenolics, aminoplasts, urethanes, epoxies, acrylics, cyanates, isocyanurates, glue, and combinations thereof. In some embodiments, the binder can include acrylic acid polymer, methyl acrylate, methyl methacrylate and acrylic acid 2-ethyl hexyl fat, initiator comprises benzophenone, related aminobenzophenones diethylaluminium, colorless crystal violet, toluene sulfonic acid-hydrate and diamond GH malachite green, 9G comprises a photopolymerizable monomer, APG-400 and the BPE-500, the solvent comprises methyl ethyl ketone.

The adhesive can include a viscoelastic or elastomeric adhesive. Viscoelastic or elastomeric adhesives can include those described in U.S. Pat. App. Pub. No. 2016/0016338 (Radcliffe et al.), for example, pressure-sensitive adhesives (PSAs), rubber-based adhesives (e.g., rubber, urethane) and silicone-based adhesives. Viscoelastic or elastomeric adhesives also include heat-activated adhesives which are non-tacky at room temperature but become temporarily tacky and are capable of bonding to a substrate at elevated temperatures. Heat activated adhesives are activated at an activation temperature and above this temperature have similar viscoelastic characteristics as PSAs. Viscoelastic or elastomeric adhesives may be substantially transparent and optically clear. Any of the viscoelastic or elastomeric adhesives of the present description may be viscoelastic optically clear adhesives. Elastomeric materials may have an elongation at break of greater than about 20 percent, or greater than about 50 percent, or greater than about 100 percent. Viscoelastic or elastomeric adhesive layers may be applied directly as a substantially 100 percent solids adhesive or may be formed by coating a solvent-borne adhesive and evaporating the solvent. Viscoelastic or elastomeric adhesives may be hot melt adhesives which may be melted, applied in the melted form and then cooled to form a viscoelastic or elastomeric adhesive layer. Suitable viscoelastic or elastomeric adhesives include elastomeric polyurethane or silicone adhesives and the viscoelastic optically clear adhesives CEF22, 817x, and 818x, all available from 3M Company, St. Paul, Minn. Other useful viscoelastic or elastomeric adhesives include PSAs based on styrene block copolymers, (meth)acrylic block copolymers, polyvinyl ethers, polyolefins, and poly(meth)acrylates. The first or second adhesive layer 160 or 180 can include a UV cured adhesive.

The monolayer of beads can include $SiO_2$ beads, polymeric resin beads, polystyrene beads or Polymethyl methacrylate (PMMA) beads. Protective layer can be made of various combinations of a polymer, hard coat, silsequioxane, silazine, oxide and/or glass with high light transmission.

The substrate 120 can have any index of refraction that may be desirable in an application. For example, in some cases, the index of refraction of the substrate is in a range from about 1.4 to about 1.8, or from about 1.5 to about 1.8, or from about 1.5 to about 1.7. In some cases, the index of refraction of the substrate is not less than about 1.5, or not less than about 1.55, or not less than about 1.6, or not less than about 1.65, or not less than about 1.7.

The security element of current application can be used as an identification feature for security and authentication applications, for example, an anti-counterfeit label, an authentication tape, or an identification feature for document authentication, license plate, driver license, passport and currency, advanced food, pharmaceutical and healthcare packaging. The security element can display a unique reflective diffraction pattern, for example, sharp spectral lines and/or dots. A method to verify the authenticity of an article is describe. The method can include providing the security element of current application and obtaining a reflective diffraction pattern from the security element. The method can further include determining the authenticity based on the reflective diffraction pattern, for example by the user's eye, or visible light detection apparatus. In some embodiments, the reflective diffraction pattern can be obtained by applying a laser to the security element The following embodiments are intended to be illustrative of the present disclosure and not limiting.

EMBODIMENTS

The following working examples are intended to be illustrative of the present disclosure and not limiting.

Embodiment 1 is a security element, comprising: a substrate; a monolayer of beads on the substrate; and a metal layer on the monolayer of beads; wherein the size of the beads is in between about 100 nm to about 50 μm.

Embodiment 2 is the security element of embodiment 1, wherein the metal layer is a discontinuous metal layer.

Embodiment 3 is the security element of embodiment 1, wherein the metal layer is a continuous metal layer.

Embodiment 4 is the security element of any one of embodiments 1 to 3, wherein the monolayer of beads is a continuous monolayer.

Embodiment 5 is the security element of any one of embodiments 1 to 4, wherein the monolayer of beads is not patterned.

Embodiment 6 is the security element of any one of embodiments 1 to 5, wherein the monolayer of beads comprises bead-less domains in a random order.

Embodiment 7 is the security element of any one of embodiments 1 to 5, wherein the monolayer of beads comprises ordered bead-less domains.

Embodiment 8 is the security element of any one of embodiments 1 to 7, further comprising a binder.

Embodiment 9 is the security element of any one of embodiments 1 to 8, further comprises an additional monolayer of beads and an additional metal layer on the additional monolayer of beads.

Embodiment 10 is the security element of any one of embodiments 1 to 9, wherein the metal layer comprises individual metals, multilayer metals, two or more metals as mixtures, inter-metallics or alloys, semi-metals or metalloids, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, diamond-like carbon, diamond-like glass, graphene, and combinations thereof Embodiment 11 is the security element of embodiment 10, wherein the individual metals are selected from the group of Au, Ag, Pt, Cu, Al and Cr.

Embodiment 12 is the security element of any one of embodiments 1 to 11, wherein the beads are $SiO_2$ beads, polystyrene beads or PMMA beads.

Embodiment 13 is the security element of any one of embodiments 1 to 12, wherein the security element is an anti-counterfeit label.

Embodiment 14 is an article, comprising the security element of any one of embodiments 1 to 13, and an adhesive, wherein the security element is embedded in the adhesive.

Embodiment 15 is an article, comprising the security element of any one of embodiments 1 to 13, and a protective layer, wherein the security element is embedded in the protective layer.

Embodiment 16 is a method, comprising: providing the security element of any one of embodiments 1 to 13; and obtaining a reflective diffraction pattern from the security element.

Embodiment 17 is the method of embodiment 16, further comprising determining the authenticity based on the reflective diffraction pattern.

Embodiment 18 is the method of embodiment 17, wherein determining the authenticity comprises determine the pattern by the user's eye, or visible light detection apparatus.

Embodiment 19 is the method of any one of embodiments 16 to 18, wherein obtaining the reflective diffraction pattern comprises applying a laser to the security element.

EXAMPLES

The following Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, and the like in the Examples and the rest of the specification are provided on the basis of weight. Solvents and other reagents used may be obtained from Sigma-Aldrich Chemical Company (Milwaukee, Wis.) unless otherwise noted.

Test Methods

The following test methods were used to characterize sputtered silver coatings and fabricated articles.

Method 1: Reflective Diffraction Pattern

A laser beam from a laser pointer is pointed on the surface of the article and the reflective diffraction pattern is projected onto a paper, Post-it, or any substrate that can used as a projection screen. The distance between the laser pointer and the surface of the article can be from couples of centimeter to tens of centimeter. The angle of the incident laser beam to the surface of the article can be from 5° to 75°. The reflective diffraction patterns can be visualized on the projection screen. A portion of a circular or elliptical diffraction pattern is normally observed and is referred to as an arc type diffraction pattern in this invention.

Example 1

The components of a coating solution prepared for Example 1 are provided in Table 1. The components were combined with stirring until a homogenous solution was obtained. The coating solution was applied onto 2 mil thick PET film through a slot die to form a coating 4 inches in width at a line speed of 20 feet per minute with a coating flow rate of 3.9 $cm^3$ per minute, then dried by passage through a drying oven 10 feet in length at a temperature of 180° F., and further cured by an H-type UV bulb, providing a cured coating containing a monolayer of PMMA beads.

TABLE 1

Example 1 coating solution composition.

| Description or reference | Component weight in formulation | Supplier (Location) |
|---|---|---|
| 800 nm PMMA bead, MX-80H3wT | 45 g | Soken Chemical (Tokyo, Japan) |
| Irgacure 819 | 0.5 g | BASF Corp. (Florham Park, NJ) |
| SR238 | 4 g | Sartomer Arkema Group (Exton, PA) |
| SR399 | 1 g | Sartomer Arkema Group (Exton, PA) |
| Toluene | 367 g | Millipore-Sigma (St. Louis, MO) |
| Isopropanol | 81 g | Millipore-Sigma (St. Louis, MO) |
| Tego Rad 2250 | 0.2 g | Evonik Industries (Essen, Germany) |

Example 2

A coating of silver was deposited on the coated film of Example 1 using a 76.2 mm round silver target in a batch vacuum sputter coater. The sample from Example 1 was placed on a substrate holder set up inside a vacuum chamber with the silver sputtering target located at a height of 228.6 mm above the substrate holder. The monolayer bead coating of the sample from Example 1 was facing the sputtering target. After the vacuum chamber was evacuated to $2\times10^{-5}$ torr base pressure, argon was admitted inside the chamber and the total pressure of the vacuum chamber was adjusted to 3 millitorr. Sputtering was initiated using a DC power supply at a constant power level of 0.5 kilowatts until the coating thickness reached 100 nm. An arc type of reflective diffraction pattern was observed by Test Method #1 from the metallized sample.

Example 3

The components of a coating solution prepared for Example 3 are provided in Table 2. The components were combined with stirring until a homogenous solution was obtained. The coating solution was applied onto 2 mil thick PET film through a slot die to form a coating 4 inches in width at a line speed of 20 feet per minute with a coating flow rate of 10 $cm^3$ per minute, then dried by passage through a drying oven 10 feet in length at a temperature of 180° F., and further cured by an H-type UV bulb, providing a cured coating containing a monolayer of PMMA beads.

TABLE 2

Example 3 coating solution composition.

| Description or reference | Component weight in formulation | Supplier (Location) |
|---|---|---|
| 3 micron PMMA bead, MX-300 | 52.1 g | Soken Chemical (Tokyo, Japan) |
| Carbon Black Dispersion, D3110K-M | 27.4 g | RJA Dispersions, LLC (Maplewood, MN) |
| Irgacure 819 | 0.36 g | BASF Corp. (Florham Park, NJ) |
| Irgacure 184 | 0.68 g | Sartomer Arkema Group (Exton, PA) |
| SR238 | 7.1 g | Sartomer Arkema Group (Exton, PA) |
| 1 methoxy 2 propanol | 119 g | Millipore-Sigma (St. Louis, MO) |
| Toluene | 114 g | Millipore-Sigma (St. Louis, MO) |
| Isopropanol | 108 g | Millipore-Sigma (St. Louis, MO) |
| Tego Rad 2250 | 0.26 g | Evonik Industries (Essen, Germany) |

Example 4

A coating of silver was deposited on the coated film of Example 3 using a 76.2 mm round silver target in a batch vacuum sputter coater. The sample from Example 3 was placed on a substrate holder set up inside a vacuum chamber with a sputtering metal target located at a height of 228.6 mm above the substrate holder. The monolayer bead coating of the sample from Example 3 was facing the sputtering target. After the vacuum chamber was evacuated to $2\times10^{-5}$ torr base pressure, argon was admitted inside the chamber and the total pressure of the vacuum chamber was adjusted to 3 millitorr. Sputtering was initiated using a DC power supply at a constant power level of 0.5 kilowatts until the coating thickness reached 100 nm. An arc type of reflective diffraction pattern was observed by Test Method #1 from the metallized sample.

Example 5

The components of a coating solution prepared for Example 5 are provided in Table 3. The components were combined with stirring until a homogenous solution was obtained. The coating solution was applied onto 2 mil PET through a slot die to form a coating 4 inches in width at a line speed of 250 feet per minute with a coating flow rate of 116 $cm^3$ per minute, then dried by passage through a 30 feet long air floatation dryer at the temperature of 120° F., and further cured by a H type UV bulb, providing a cured coating containing a monolayer of PMMA beads.

TABLE 3

Example 5 coating solution composition.

| Description or reference | Component weight in formulation | Supplier (Location) |
|---|---|---|
| 3 micron PMMA bead, MX-300 | 214.9 g | Soken Chemical (Tokyo, Japan) |
| Irgacure 819 | 0.64 g | BASF Corp. (Florham Park, NJ) |
| Irgacure 184 | 4.2 g | Sartomer Arkema Group (Exton, PA) |
| SR399 | 213.2 g | Sartomer Arkema Group (Exton, PA) |
| Toluene | 2059 g | Millipore-Sigma (St. Louis, MO) |
| Isopropanol | 367 g | Millipore-Sigma (St. Louis, MO) |
| Tego Rad 2250 | 1.1 g | Evonik Industries (Essen, Germany) |

Example 6

A coating of silver was deposited on the coated film of Example 5 using a 76.2 mm round silver target in a batch vacuum sputter coater. The sample from Example 5 was placed on a substrate holder set up inside a vacuum chamber with a sputtering metal target located at a height of 228.6 mm above the substrate holder. The monolayer bead coating of the sample from Example 5 was facing the sputtering target. After the vacuum chamber was evacuated to $2\times10^{-5}$ torr base pressure, argon was admitted inside the chamber and the total pressure of the vacuum chamber was adjusted to 3 millitorr. Sputtering was initiated using a DC power supply at a constant power level of 0.5 kilowatts until the coating thickness reached 100 nm. An arc type of reflective diffraction pattern was observed by Test Method #1 from the metallized sample.

All references and publications cited herein are expressly incorporated herein by reference in their entirety into this disclosure. Illustrative embodiments of this invention are discussed and reference has been made to possible variations within the scope of this invention. For example, features depicted in connection with one illustrative embodiment may be used in connection with other embodiments of the invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A security element, comprising:

a substrate;

a monolayer of beads on the substrate; and a metal layer on and in direct contact with the monolayer of beads;

wherein the size of the beads is in between 100 nm to 50 μm, and wherein the monolayer of beads comprises bead-less domains in a random order.

2. The security element of claim 1, wherein the metal layer is a discontinuous metal layer.

3. The security element of claim 1, wherein the metal layer is a continuous metal layer.

4. The security element of claim 1, wherein the monolayer of beads is a continuous monolayer.

5. The security element of claim 1, wherein the monolayer of beads is not patterned.

6. The security element of claim 1, further comprising a binder.

7. The security element of claim 1, further comprises an additional monolayer of beads and an additional metal layer on the additional monolayer of beads.

8. The security element of claim 1, wherein the metal layer comprises individual metals, multilayer metals, two or more metals as mixtures, inter-metallics or alloys, semi-metals or metalloids, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, diamond-like carbon, diamond-like glass, graphene, and combinations thereof.

9. The security element of claim 8, wherein the individual metals are selected from the group of Au, Ag, Pt, Cu, Al and Cr.

10. The security element of claim 1, wherein the beads are $SiO_2$ beads, polystyrene beads or PMMA beads.

11. The security element of claim 1, wherein the security element is an anti-counterfeit label.

12. An article, comprising the security element of claim 1, and an adhesive, wherein the security element is embedded in the adhesive.

13. An article, comprising the security element of claim 1, and a protective layer, wherein the security element is embedded in the protective layer.

14. A method, comprising:

providing the security element of claim 1; and obtaining a reflective diffraction pattern from the security element.

15. The method of claim 14, wherein obtaining the reflective diffraction pattern comprises applying a laser to the security element.

* * * * *